Patented Mar. 31, 1936

2,035,997

UNITED STATES PATENT OFFICE 2,035,997

METHOD OF PRODUCING ARTIFICIAL SILK

Max Joseph Theumann, Lyon, France, assignor to Du Pont Rayon Company, New York, N. Y., a corporation of Delaware No Drawing. Application October 28, 1932, Serial No. 640,012. In France November 14, 1931

19 Claims. (Cl. 106—40)

This invention relates to the manufacture of artificial silk. More particularly it relates to the production of artificial silk having a luster or sheen comparable to that possessed by natural silk.

As will become apparent from the following description and appended claims, an object of this invention is to produce artificial silk having incorporated therein a white, insoluble, inorganic compound in such an amount as to impart a low luster to said silk, with or without weighting the same.

Another object of this invention is to form a white, insoluble, inorganic compound by chemical reaction in an acetylating mixture containing cellulose acetate, removing the secondary or by-products formed in the reaction, and, after suitable treatment of the cellulose acetate, forming a spinning solution thereof and spinning the same.

An additional object of this invention is to provide a method which comprises forming a white, insoluble, inorganic compound, such as a salt, for example barium sulphate, or an oxide, for example titanium oxide, in an acetylating mixture containing cellulose acetate, precipitating the cellulose acetate, removing the by-products formed in the preparation of the said compound, drying said cellulose acetate, dissolving said acetate to form a solution, and spinning said solution.

According to my invention, at the end of the preparation of cellulose acetate, the acetylating mixture containing the cellulose acetate in solution is treated in a manner depending partly on the selected white, insoluble compound. When the compound is to be a salt, such as barium sulphate, the acetylating mixture is diluted with water. This mixture will contain a certain quantity of sulphuric acid, if this acid has been used as the catalytic or hydrolizing agent. If sulphuric acid is not used in the acetylating process or if the amount thereof present is insufficient for the desired reaction, it is added to the mixture in such proportions as necessary. To this mixture there is then added a solution of a barium salt whereby barium sulphate is formed in the mixture. After the mixture has been thoroughly mixed, the entire mass is precipitated into a large quantity of water. After washing and drying, the precipitated product is dissolved in appropriate solvents and a cellulose acetate collodion for spinning is prepared.

With an amount of 5% of barium sulphate on the weight of the cellulose acetate, a silk having a luster approaching the luster of natural silk may be obtained. In some cases, a smaller quantity, such as approximately 2% of barium sulphate, based on the mass of the thread has been effective, though not to such a marked degree as when larger quantities are employed. I have obtained cellulose acetate silks containing up to 25% of barium sulphate on the weight of the silk. These silks possess a great suppleness and are adapted for weaving and knitting. With such high proportions of barium sulphate this product not only functions as a delustering agent but truly as a weighting agent.

In order to more clearly explain my invention, the following specific examples are given. It should be understood that these examples are merely illustrative and in no wise limit the nature and scope of the invention.

At the end of the operation in the acetylation of cellulose, the acetylating mixture containing cellulose acetate in solution is diluted with water. The composition of the solution obtained is, for example, as follows:

|  | Parts |
|---|---|
| Cellulose acetate | 1 |
| Acetic acid | 9 |
| Water | 5 |

In addition, this solution may contain a certain quantity of sulphuric acid if this acid has been used as the catalytic or hydrolizing agent. If the quantity of sulphuric acid which is present in this solution is less than the amount necessary to produce the quantity of barium sulphate which it is desired to obtain, it is brought to the required concentration by the addition of the necessary quantity of sulphuric acid. A solution of barium chloride in dilute acetic acid is then gradually added to this mixture, the composition of this solution being, for example, as follows:

|  | Parts |
|---|---|
| $BaCl_2.2(H_2O)$ | 20 |
| Acetic acid | 20 |
| Water | 60 |

This solution is added in the proportion of 8½ liters to 100 liters of the cellulose acetate solution.

The mixture is then thoroughly agitated for about five minutes. At the end of this mixing the whole mass is precipitated in a large quantity of water. The precipitated product is washed and dried and subsequently made into a cellulose acetate collodion of suitable concentration by dissolving the same in predetermined quantities of appropriate solvent. This collodion is capable of being filtered and spun by the usual methods.

Rayon produced from collodions prepared by this method may contain approximately 20% of barium sulphate and 80% of cellulose acetate. It is, of course, obvious that the rayon may contain any desired amount of barium sulphate, and the specific amount here set forth is merely illustrative and not limitative. The rayon has an opaque and white appearance, is supple to the touch and possesses a higher covering power than rayon produced without such ingredients. This rayon can be subjected to repeated washings in water, hot or cold, without the danger of the loss of any of the barium sulphate. Furthermore, this rayon can be dyed by any of the processes usually employed for cellulose acetate silk.

Various modifications in the above-described method may be made. For example, if desired, instead of forming the barium sulphate in the acetylating mixture, it is possible to start from the cellulose acetate which has been manufactured without being weighted with barium sulphate. This cellulose acetate is dissolved in a suitable solvent or solvent mixture and the barium sulphate prepared therein by double decomposition. After the precipitation of the barium sulphate, the entire mass is precipitated in a large quantity of water. The precipitated cellulose acetate weighted with barium sulphate is subsequently washed and dried. The dried product is then formed into the collodion which is to be spun. This method is naturally less economical than the one above described and which consists in forming the barium sulphate in the acetylating mixture.

Instead of barium chloride, a soluble lead salt may be used in the foregoing procedure. Of course the concentraton of the sulphuric acid and the soluble lead salt are adjusted to give the desired results.

When an oxide, such as titanium oxide, constitutes the white insoluble inorganic compound, a procedure such as that hereafter set forth may be utilized:

At the end of the acetylation of cellulose, the mixture containing the cellulose acetate in solution may have a composition which is, for example, as follows:

|  | Parts |
|---|---|
| Cellulose acetate | 1.0 |
| Acetic acid | 6.5 |
| Water | 1.5 |

To this solution there is added a solution containing a hydrolyzable titanium salt, such as tetrachloride, the composition of which, for example, may be as follows:

|  | Parts |
|---|---|
| Titanium tetrachloride | 1.0 |
| Acetic acid | 15.0 |
| Water | 30.0 |

In accordance with this modification, 30 liters of the titanium tetrachloride solution are added to 100 parts of the cellulose acetate solution. Simultaneously with the addition of the titanium tetrachloride, 20 liters of water are also added and the mass thoroughly agitated. The mixture is then precipitated in a large quantity of water, the precipitated product being subsequently washed, dried and finally dissolved in appropriate solvents to produce a spinning solution of desired concentration. The spinning solution is finally spun in the usual manner.

Rayon produced in accordance with the foregoing procedure is characterized by a low luster, opaque appearance, increased covering power and contains approximately 97.5% cellulose acetate and about 2.5% titanium oxide. Obviously, this embodiment is not restricted to these precise proportions. The quantity of titanium oxide incorporated in the yarn may vary within wide limits such as, for example, 0.1% to 5.0% or more based on the mass of the thread.

It is further to be understood that the titanium oxide may be formed in the mass by the hydrolysis of other titanium salts, such as the sulphate.

The above described processes, though described particularly with respect to cellulose acetate rayon, are applicable to any rayon, the basis of which is some other cellulose derivative (ester or ether). It is also evident that the present process can be applied to the preparation of rayon, the base of which is a cellulose derivative which has been delustered and, if desired, also weighted with any white inorganic compound insoluble in water and obtained under conditions of preparation as above described.

Since various modifications may be made in the specific details above described, I do not intend to limit myself thereto except as set forth in the appended claims.

This application is a continuation-in-part of application Serial No. 285,785, filed June 15, 1928.

I claim:

1. A method of making a composition suitable for producing artificial silk having a low luster which comprises forming by chemical reaction a water-insoluble, white, inorganic compound in a solution containing a cellulose derivative, precipitating said cellulose derivative with the inorganic compound distributed therethrough and eliminating the by-products formed in said chemical reaction and thereafter forming a spinning solution of said cellulose derivative and said inorganic compound.

2. A method of making a composition suitable for producing artificial silk having a low luster which comprises forming by chemical reaction a water-insoluble, white, inorganic compound in a solution containing a cellulose derivative, precipitating said cellulose derivative with the inorganic compound distributed therethrough and eliminating the by-products formed in said chemical reaction, drying the mass containing said cellulose derivative and said inorganic compound thereafter forming a spinning solution of the dried mass.

3. A method of making a composition suitable for producing artificial silk having a low luster which comprises forming by chemical reaction a water-insoluble, white, inorganic compound in a solution containing cellulose acetate, precipitating said cellulose acetate with the inorganic compound distributed therethrough and eliminating the by-products formed in said chemical reaction and thereafter treating said cellulose acetate and said inorganic compound to form a spinning solution.

4. A method of making a composition suitable for producing artificial silk having a low luster which comprises forming by chemical reaction a water-insoluble, white, inorganic compound in an acetylating mixture containing cellulose acetate, precipitating said cellulose acetate with the inorganic compound distributed therethrough and eliminating the by-products formed in said retate and said inorganic compound to form a spinning solution.

5. A method of making a composition suitable for producing artificial silk having a low luster which comprises forming by chemical reaction a water-insoluble, white, inorganic compound in an acetylating mixture containing cellulose acetate, precipitating said cellulose acetate with the inorganic compound distributed therethrough and eliminating the by-products formed in said reaction, drying the mass containing said cellulose acetate and said inorganic compound to form a spinning solution thereafter treating the dried mass.

6. A method of making a composition suitable for producing artificial silk having a low luster which comprises forming titanium oxide in an acetylating mixture containing cellulose acetate, precipitating said cellulose acetate with the titanium oxide distributed therethrough and eliminating the by-products formed in the reaction and treating said cellulose acetate and titanium oxide to form a solution.

7. A method of making a composition suitable for producing artificial silk having a low luster which comprises forming titanium oxide in an acetylating mixture containing cellulose acetate, precipitating said cellulose acetate with the titanium oxide distributed therethrough, drying the mass containing the said precipitated cellulose acetate and titanium oxide treating the dried mass to form a spinning solution.

8. A method of making a composition suitable for producing artificial silk having a low luster which comprises forming titanium oxide in an acetylating mixture containing cellulose acetate, precipitating said cellulose acetate with the titanium oxide distributed therethrough and eliminating the by-products formed in the reaction, drying the mass containing the said precipitated cellulose acetate and titanium oxide dissolving the dried mass to form a spinning solution.

9. A method of making a composition suitable for producing artificial silk having a low luster which comprises adding a solution containing a titanium salt to an acetylating mixture containing cellulose acetate, converting said titanium salt to titanium oxide, precipitating said cellulose acetate with the titanium oxide distributed therethrough, drying said precipitate and treating said precipitate to form a spinning solution.

10. A method of making a composition suitable for producing artificial silk having a low luster which comprises adding a solution containing a titanium salt to an acetylating mixture containing cellulose acetate, converting said titanium salt to titanium oxide, precipitating said cellulose acetate with the titanium oxide distributed therethrough and eliminating the by-products formed, drying said precipitate and treating said precipitate to form a spinning solution.

11. A method of making a composition suitable for producing artificial silk having a low luster which comprises adding a solution containing titanium tetrachloride to an acetylating mixture containing cellulose acetate, converting said titanium tetrachloride into titanium oxide, precipitating said cellulose acetate with the titanium oxide distributed therethrough, drying said precipitate and treating said precipitate to form a spinning solution.

12. A method of making a composition suitable for producing artificial silk having a low luster which comprises forming barium sulphate in an acetylating mixture containing cellulose acetate, precipitating said cellulose acetate and eliminating the by-products formed in the reaction and dissolving said cellulose acetate to form a spinning solution.

13. A method of making a composition suitable for producing artificial silk having a low luster which comprises forming barium sulphate in an acetylating mixture containing cellulose acetate, precipitating said cellulose acetate and dissolving said cellulose acetate to form a spinning solution.

14. A method of making a composition suitable for producing artificial silk having a low luster which comprises forming barium sulphate in an acetylating mixture containing cellulose acetate, precipitating said cellulose acetate, drying said precipitated cellulose acetate and dissolving said cellulose acetate to form a spinning solution.

15. A method of making a composition suitable for producing artificial silk having a low luster which comprises forming barium sulphate in an acetylating mixture containing cellulose acetate, precipitating said cellulose acetate and eliminating the by-products formed in the reaction, drying said precipitated cellulose acetate and dissolving said cellulose acetate to form a spinning solution.

16. A method of making a composition suitable for producing artificial silk having a low luster which comprises adding a solution containing a barium salt to an acetylating mixture containing sulphuric acid and cellulose acetate, precipitating said cellulose acetate, drying said precipitate and dissolving said precipitate to form a spinning solution.

17. A method of making a composition suitable for producing artificial silk having a low luster which comprises adding a solution containing a barium salt to an acetylating mixture containing sulphuric acid and cellulose acetate, precipitating said cellulose acetate and eliminating the by-products formed, drying said precipitate and dissolving said precipitate to form a spinning solution.

18. A method of making a composition suitable for producing artificial silk having a low luster which comprises adding a solution containing a barium chloride to an acetylating mixture containing sulphuric acid and cellulose acetate, precipitating said cellulose acetate, drying said precipitate and dissolving said precipitate to form a spinning solution.

19. A method of making a composition suitable for producing artificial silk having a low luster which comprises adding a solution containing a barium chloride to an acetylating mixture containing sulphuric acid and cellulose acetate, precipitating said cellulose acetate and eliminating the by-products formed, drying said precipitate and dissolving said precipitate to form a spinning solution.

MAX JOSEPH THEUMANN.

CERTIFICATE OF CORRECTION.

Patent No. 2,035,997.

March 31, 1936.

MAX JOSEPH THEUMANN.

It is hereby certified that error appears in the printed specification of the above numbered patent requiring correction as follows: Page 2, second column, line 1, strike out the words and syllable "action and thereafter treating said cellulose ace-" and insert the same as the second line in first column, page 3; page 2, second column, line 55, claim 2, before the word "thereafter" insert and; page 3, first column, lines 13, 14 and 15, claim 5, strike out the words "to form a spinning solution thereafter treating the dried mass" and insert instead and thereafter treating the dried mass to form a spinning solution; same page and column, line 32, claim 7, and line 42, claim 8, after "oxide" insert and; and that the said Letters Patent should be read with these corrections therein that the same may conform to the record of the case in the Patent Office.

Signed and sealed this 12th day of May, A. D. 1936.

Leslie Frazer (Seal)

Acting Commissioner of Patents.